United States Patent
Vojtisek et al.

(10) Patent No.: US 12,441,591 B2
(45) Date of Patent: Oct. 14, 2025

(54) VEHICLE WINCH SYSTEM

(71) Applicant: Ford Global Technologies, LLC, Dearborn, MI (US)

(72) Inventors: Mark George Vojtisek, Royal Oak, MI (US); Christopher Thomas Berchin, Dearborn, MI (US); Theresa Carranza-Fulmer, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 419 days.

(21) Appl. No.: 18/102,951

(22) Filed: Jan. 30, 2023

(65) Prior Publication Data
US 2024/0253955 A1    Aug. 1, 2024

(51) Int. Cl.
B66D 1/48    (2006.01)

(52) U.S. Cl.
CPC ............................ B66D 1/48 (2013.01)

(58) Field of Classification Search
CPC .............................. B66D 1/48; E05B 73/0017
USPC ............................................... 70/57.1
See application file for complete search history.

(56) References Cited

U.S. PATENT DOCUMENTS

| | | | |
|---|---|---|---|
| 4,574,268 A * | 3/1986 | Ohnishi | B60R 25/1001 180/173 |
| 6,542,076 B1 | 4/2003 | Joao | |
| 7,233,245 B2 * | 6/2007 | O'Neill | B60R 25/104 70/57.1 |
| 9,738,125 B1 | 8/2017 | Brickley et al. | |
| 2003/0193404 A1 * | 10/2003 | Joao | B64D 45/0015 340/426.13 |
| 2003/0205703 A1 * | 11/2003 | McCormick | B66D 1/14 254/267 |
| 2011/0260126 A1 * | 10/2011 | Willis | B66D 1/52 254/283 |
| 2015/0284226 A1 * | 10/2015 | Hall | B66D 1/38 414/800 |
| 2016/0046468 A1 * | 2/2016 | Heravi | B66D 1/54 715/835 |
| 2018/0290621 A1 * | 10/2018 | Seaman | G06Q 50/40 |
| 2019/0292026 A1 * | 9/2019 | Felps | B66D 1/485 |
| 2022/0185638 A1 * | 6/2022 | Hausladen | B65H 54/2875 |

FOREIGN PATENT DOCUMENTS

| | | |
|---|---|---|
| EP | 3357858 A1 | 8/2018 |
| GB | 2443619 A | 5/2008 |
| GB | 2515453 A | 12/2014 |
| WO | WO2014/154764 A1 | 10/2014 |

* cited by examiner

*Primary Examiner* — Anna M Momper
*Assistant Examiner* — Nathaniel L Adams
(74) *Attorney, Agent, or Firm* — Frank Lollo; Price Heneveld LLP (57) ABSTRACT

A winch system for a vehicle is provided herein. The winch system includes a winch assembly that is coupled to a body. A sensor system is configured to monitor the winch assembly. A controller processes information from the sensor system. The controller is configured to determine a duration of use and service condition of the winch assembly. The controller is also configured to determine an unauthorized condition based on tampering. The controller is further configured to determine an operational condition from at least one of the service condition and the unauthorized condition. A display generates a visual message when the controller determines the operational condition.

13 Claims, 5 Drawing Sheets

VEHICLE WINCH SYSTEM

FIELD OF THE DISCLOSURE

The present disclosure generally relates to a vehicle winch, in particular, a vehicle winch assembly with a vehicle winch sensor system.

BACKGROUND OF THE DISCLOSURE

Consumers often compare available features and functionality between vehicles when making a purchasing decision. Accordingly, additional solutions are generally desired that provide features and functionality that are desirable to consumers.

SUMMARY OF THE DISCLOSURE

According to a first aspect of the present disclosure, a winch system for a vehicle includes a winch assembly. The winch assembly includes a housing. A spool is rotatably disposed within the housing. A motor is coupled to the spool and to the housing, and a cable is operably disposed on the spool. A sensor system is configured to monitor the winch assembly. A controller processes information received from the sensor system. The controller is configured to determine a duration of use of the winch assembly based on information from the sensor system. The controller is also configured to determine a service condition of the winch assembly when the duration of use exceeds a duration of use threshold.

Embodiments of the first aspect of the present disclosure can include any one or a combination of the following features:
- a display is in communication with the controller, wherein the controller is configured to communicate a signal to the display to generate a visual message when the controller determines the service condition;
- a mobile device that includes the display;
- the sensor system is configured to detect physical wear on the winch assembly, and the controller is configured to determine the service condition based on the physical wear;
- the controller is configured to define a temperature threshold of the winch assembly, and the controller is configured to communicate a signal to the winch assembly to change the winch assembly from the active condition to the inactive condition when a temperature of the winch assembly exceeds the temperature threshold;
- the controller is configured to determine a service condition of at least one of the housing, the spool, the motor, and the cable based on information received from the sensor system;
- the sensor system further comprises a camera configured to monitor the winch assembly; and
- the camera is coupled to the housing.

According to a second aspect of the present disclosure, a winch system for a vehicle includes a winch assembly. The winch assembly is operable between an active condition and an inactive condition. A sensor system is configured to monitor the winch assembly. A controller processes information received from the sensor system. The controller is configured to determine tampering with the winch assembly based on information from the sensor system. The controller is configured to determine an unauthorized condition based on the tampering.

Embodiments of the second aspect of the present disclosure can include any one or a combination of the following features:
- a display in communication with the controller, and the controller is configured to communicate a signal to the display to generate a visual message when the controller determines the unauthorized condition;
- a mobile device that includes the display;
- the winch assembly is configured to operably decouple from the body, and the controller is configured to determine when the winch assembly is coupled to the body and when the winch assembly is decoupled from the body based on information from the sensor system, and the controller is configured to determine the unauthorized condition when the winch assembly is decoupled from the body, and the controller is configured to communicate a signal to the winch assembly to change the winch assembly from the active condition to the inactive condition when the winch assembly is decoupled from the body;
- the controller is configured to detect an interaction with the winch assembly based on information from the sensor system, and the controller is configured to determine the tampering based on a locked condition of the vehicle and the interaction, and the controller is configured to communicate a signal to the display to generate a video of the interaction when the controller determines the tampering;
- the controller is configured to communicate a signal to the winch assembly to change the winch assembly from the active condition to the inactive condition based on the unauthorized condition; and
- the controller is configured to determine an unauthorized user based on information received from the sensor system, and the controller is configured to determine the unauthorized condition based on the unauthorized user.

According to a third aspect of the present disclosure, a winch system for a vehicle includes a winch assembly. A sensor system is configured to monitor the winch assembly. A controller processes information received from the sensor system. The controller is configured to determine a duration of use of the winch assembly based on information from the sensor system. The controller is configured to determine a service condition of the winch assembly when the duration of use exceeds a duration of use threshold. The controller is configured to determine tampering with the winch assembly based on information from the sensor system. The controller is configured to determine an unauthorized condition based on the tampering. The controller is configured to determine an operational condition from at least one of the service condition and the unauthorized condition. A display is in communication with the controller, and the controller is configured to communicate a signal to the display to generate a visual message when the controller determines the operational condition.

Embodiments of the third aspect of the present disclosure can include any one or a combination of the following features:
- a mobile device that includes the display;
- the controller is configured to detect an interaction with the winch assembly based on information from the sensor system, and the controller is configured to determine the tampering based on a locked condition of the vehicle and the interaction;

the sensor system comprises a camera coupled to the winch assembly, the camera is configured to monitor the winch assembly; and the sensor system is configured to detect physical wear of the winch assembly, and the controller is configured to determine the service condition based on the physical wear.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

Figure 1:
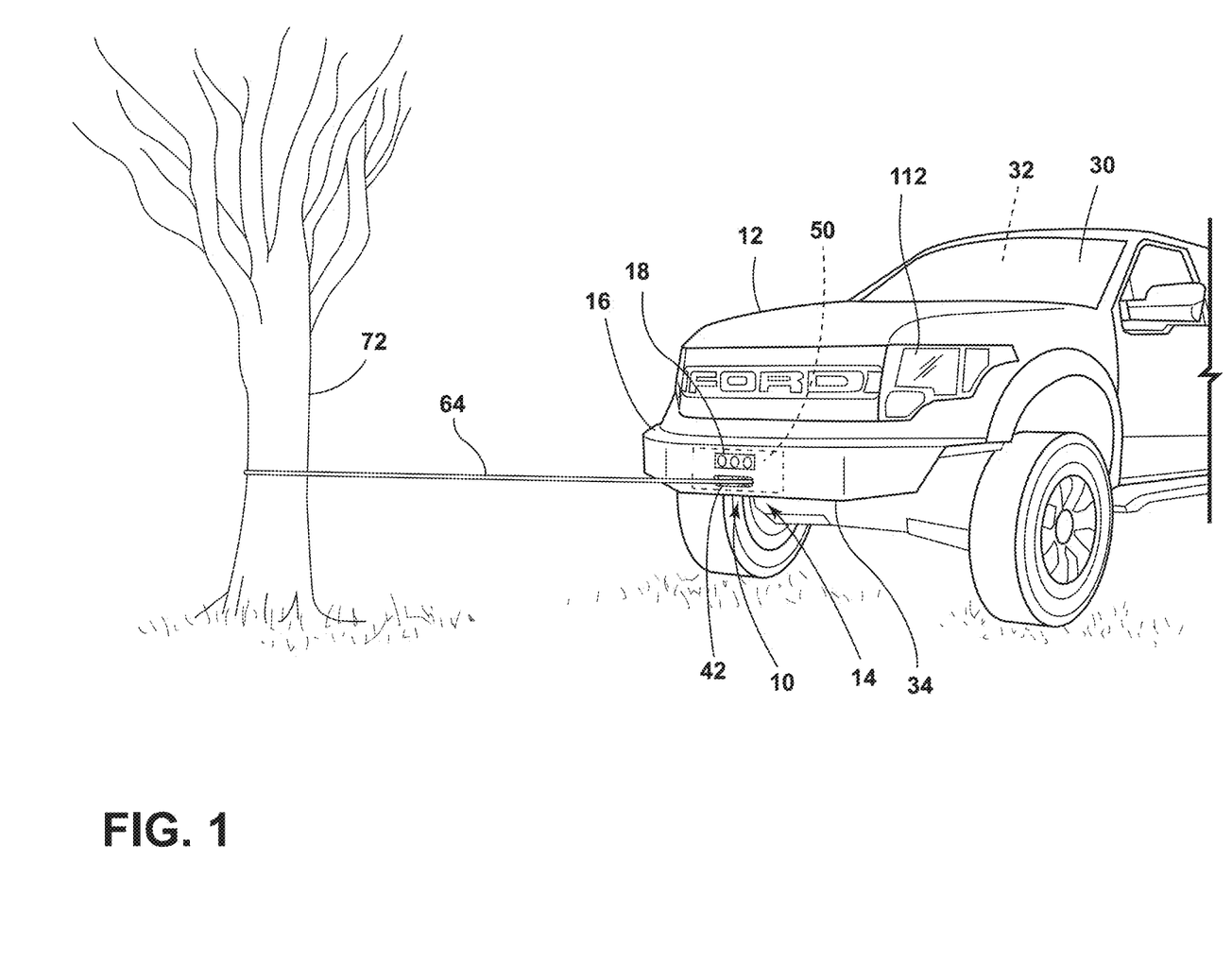
FIG. 1 is a front perspective view of a vehicle having a front bumper with a winch system, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a winch system for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In reference to FIGS. 1-5, a winch system 10 is illustrated on a motor vehicle 12. The winch system 10 may include a winch assembly 14 coupled to a body 16. The winch system 10 may include a sensor system 18 configured to monitor the winch assembly 14. A controller 20 processes information from the sensor system 18 and may determine a service condition when a determined duration of use exceeds a duration of use threshold. The controller 20 may also determine tampering of the winch assembly 14 from information received from the sensor system 18. The controller 20 may then determine an unauthorized condition based on the tampering. The controller 20 may further determine an operational condition based on at least one of the service conditions and the unauthorized condition. A display 22 may be in communication with the controller 20. The display 22 may be configured to generate a visual message when the controller 20 determines the operational condition.

Figure 2:
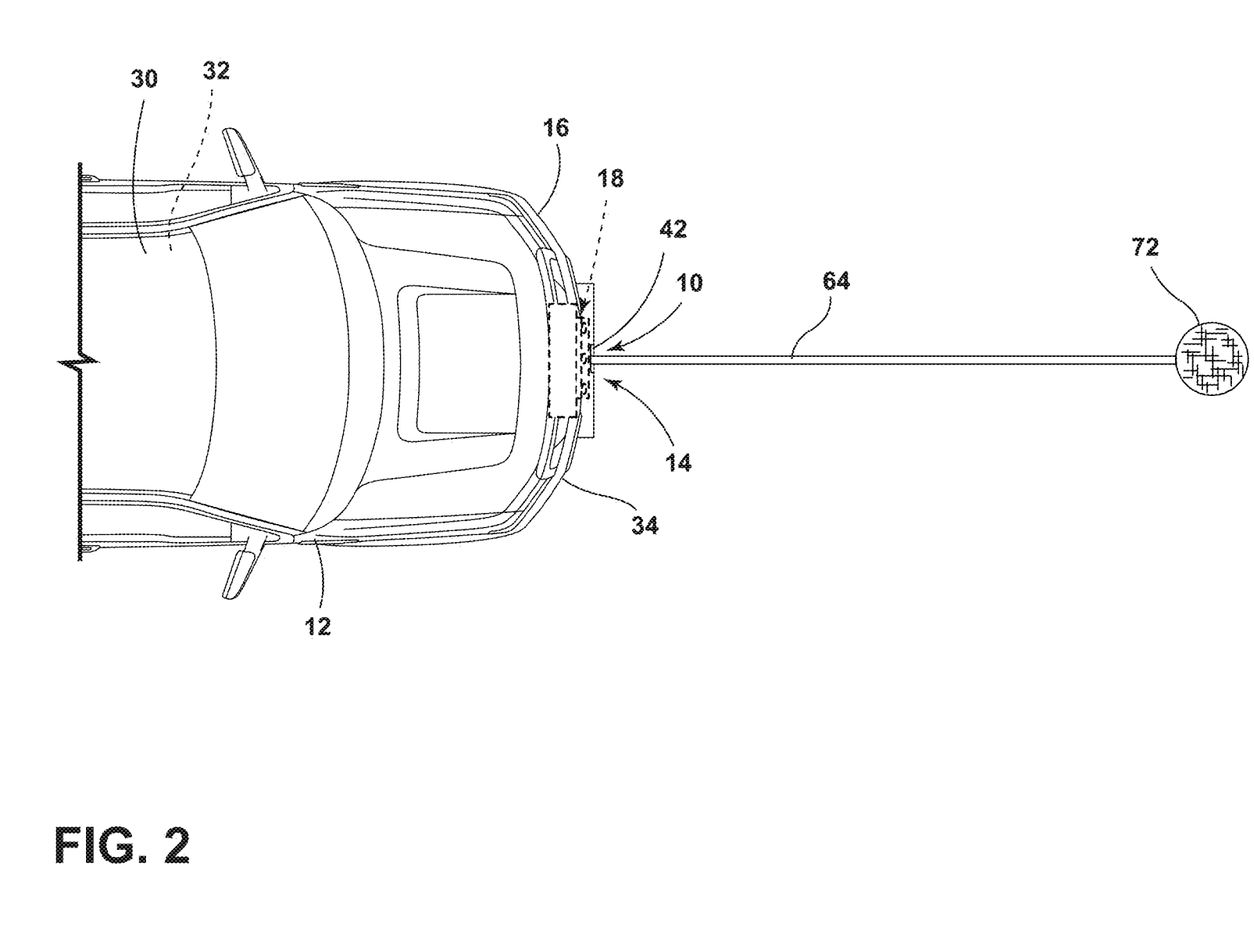
FIG. 2 is a top view of a vehicle having a front bumper with a winch system, according to one example.

With reference to the embodiments shown in FIGS. 1 and 2, the motor vehicle 12 is a pickup truck, according to one example, that is equipped with one embodiment of the winch system 10 for monitoring the winch assembly 14 and an environment around the winch assembly 14. The vehicle 12 is generally illustrated as having a cabin 30, an interior compartment 32, and a cargo bed (not shown). As illustrated in FIGS. 1 and 2, the vehicle 12 may include a front bumper 34 that can operably couple to and house the winch assembly 14.

In various examples, the vehicle 12 may also be a sedan, a sport utility vehicle, a van, a crossover, and/or other styles of vehicles. The vehicle 12 may also be a manually operated vehicle (e.g., with a human driver), a fully autonomous vehicle (e.g., no human driver), or a partially autonomous vehicle (e.g., may be operated with or without a human driver).

Referring now to FIGS. 1 and 2, the winch assembly 14 may be coupled to the body 16 of the vehicle 12. In the illustrated embodiment, the body 16 is configured as the front bumper 34 and the winch assembly 14 is coupled to the front bumper 34. In yet other embodiments, the body 16 may be configured as another aspect of the vehicle 12, such as a support bracket or portion of the vehicle 12 frame. In some embodiments, the winch assembly 14 can be housed within the body 16. In such examples, the winch assembly 14 may be accessible and deployable via an opening 42 defined on the body 16, such as an opening 42 defined on the front bumper 34. Additionally, it is generally contemplated that the body 16 may be of various sizes and shapes and may be located in various positions throughout the vehicle 12. For example, the winch assembly 14 may be located in a rear portion of the vehicle 12, such as a cargo bed of the vehicle 12.

The winch assembly 14 includes a housing 50 coupled to the body 16. In some examples, the housing 50 may be operably coupled and decoupled from the body 16. In some embodiments, the housing 50 may include a shroud 52 and an open chamber 54 defined within the shroud 52. In some embodiments, the housing 50 is configured to contain and support additional components of the winch assembly 14. Additionally, it is generally contemplated that the housing 50 may be of various sizes and may be coupled to various portions of the body 16, so long as the housing 50 may support and/or contain various aspects of the winch assembly 14.

Figure 3:
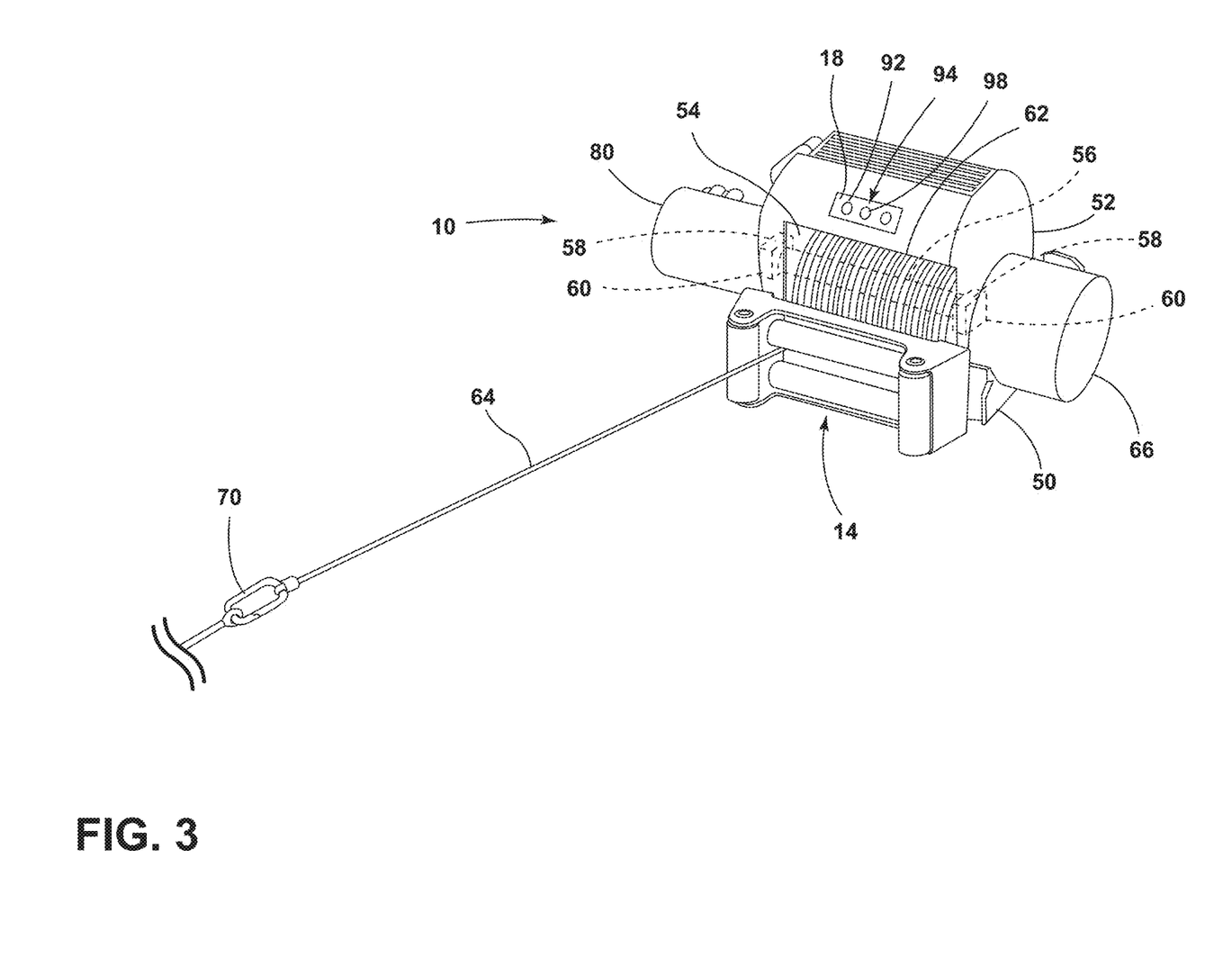
FIG. 3 is a perspective view of a winch assembly, according to one example.

Referring to FIG. 3, the winch assembly 14 further includes a spool 62 disposed within the housing 50. In some examples, the spool 62 may be disposed within the open chamber 54 and be at least partially encompassed by the shroud 52. In some embodiments, the spool 62 is rotatably coupled to a portion of the housing 50 and proximate to at least one bearing 58. For example, the spool 62 may be rotatably coupled to a shaft 56 that is rotatably coupled to the housing 50 via the pair of bearings 58 and bearing housings 60. In yet other embodiments, the spool 62 may be rotatably coupled to the housing 50 and may be proximate the opening 42. According to various embodiments, the spool 62 may generally define a cylindrical shape, the cylindrical shape having an outer periphery that retains a cable 64 wrapping around the outer periphery. Additionally, the spool 62 may be configured to rotate via a motor 66 and permit retraction and coiling of the cable 64 onto the spool 62 when the winch assembly 14 is in a recessed condition and deployment of the cable 64 away from the spool 62 when the winch assembly 14 is in a deployed condition.

Referring to FIG. 3, an engagement element 70 is coupled to an end of the cable 64. In some embodiments, the engagement element 70 may be a hook, a shackle, and/or a thimble. When the winch assembly 14 is in the recessed condition, the engagement element 70 may be disposed proximate the base opening 42. According to various embodiments, the engagement element 70 is configured to operably engage with an object 72, such as a vehicle rear bumper (not shown) or tree (not shown), that then provides an anchoring point for a winching operation.

The winch assembly 14 may be operable between the recessed condition and the deployed condition via the motor 66. In some examples, the motor 66 is an electric motor coupled to the housing 50. In various embodiments, the motor 66 is mechanically coupled to the spool 62. The motor 66 may be in communication with the controller 20 such that the controller 20 may send a signal that prompts the motor 66 to activate or deactivate. Additionally, the controller 20 may send a signal that prompts the motor 66 to operate at various speeds and directions. For example, the motor 66 may be a bi-directional electric motor with multiple speeds, and the controller 20 may send a signal prompting the motor 66 to operate in a first direction and at a second speed. Likewise, in various embodiments, the motor 66 may be configured to apply a bi-directional rotational force upon the spool 62.

Figure 4:
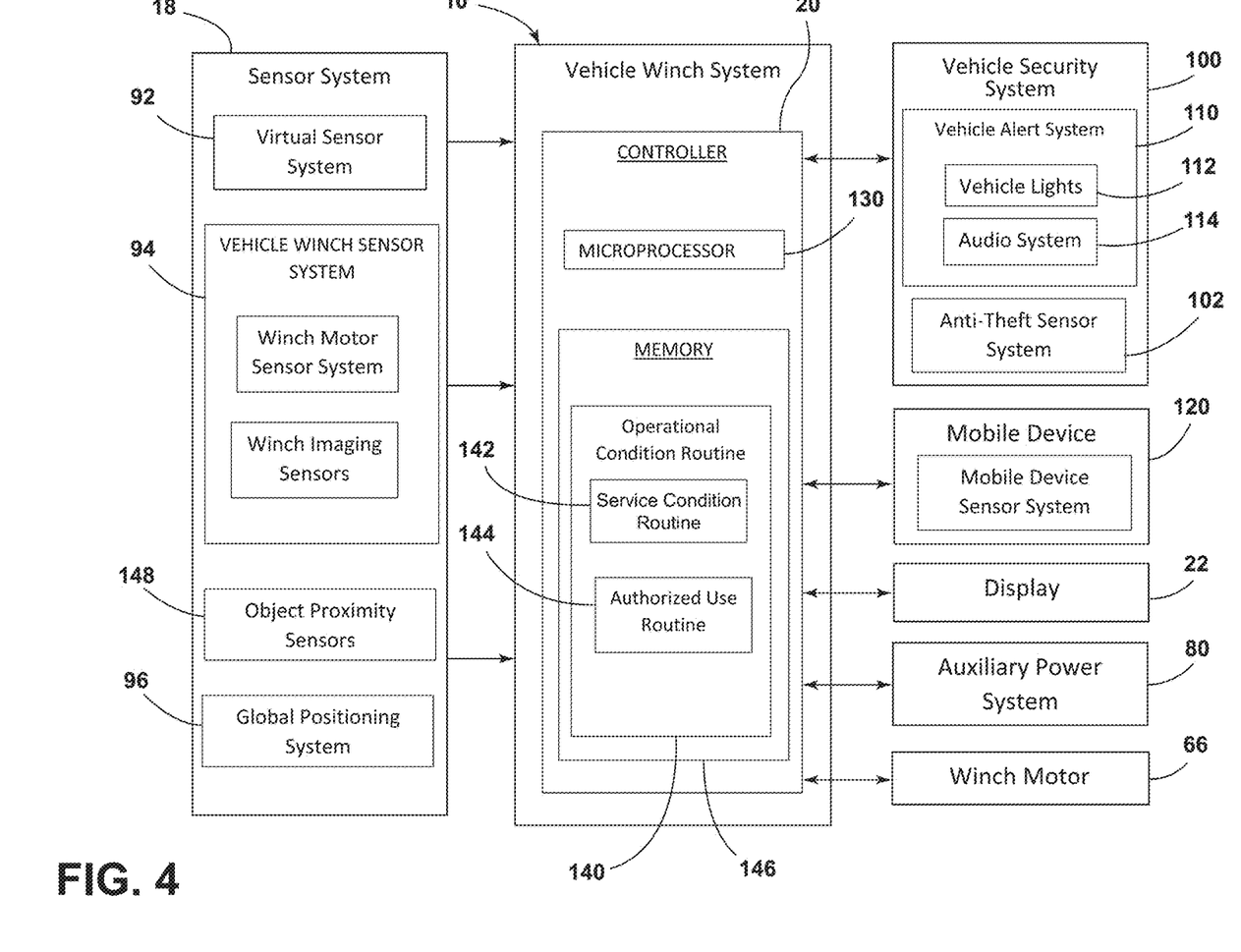
FIG. 4 is a block diagram illustrating a winch system, having a sensor system, a controller, and various other vehicle systems, according to one example.

Referring to FIGS. 3 and 4, the winch system 10 includes an auxiliary power system 80 disposed within the vehicle 12 and coupled to the body 16. In various embodiments, the auxiliary power system 80 may be disposed within a front portion of the vehicle 12. In other examples, the auxiliary power system 80 may be coupled to the housing 50. The auxiliary power system 80 may be in communication with the controller 20, such that the controller 20 may send a signal that can cycle electric power to the auxiliary power system 80. According to various embodiments, the auxiliary power system 80 is configured to selectively provide electric power to various components of the vehicle 12 and the winch system 10. For example, the auxiliary power system 80 may supply electric power to the motor 66 via a power cable (not shown).

Referring now to FIGS. 1-4, the winch system 10 includes the sensor system 18. In some embodiments, the sensor system 18 includes a plurality of sensors 92 that are configured to detect objects in the proximity of the vehicle 12. The plurality of sensors 92 may include one or a combination of visual sensors (e.g., cameras, surround view cameras, etc.) radar sensors, lidar sensors, ultrasonic sensors, lasers, thermal sensors, and/or various other sensors. For example, the vehicle 12 may include ultrasonic sensors, surround view cameras, and radar sensors disposed on the corners and front of the vehicle 12, a camera 98 on the front of the vehicle 12, a camera 98 on the rear of the vehicle 12, and a camera 98 coupled to the housing 50 and directed towards various components of winch assembly 14. It is further contemplated that, in some embodiments, one or more of the plurality of sensors 92 may be coupled to the winch assembly 14 and/or be disposed proximate the winch assembly 14, in addition to one or more sensors coupled to the vehicle 12. The sensor system 18 may be configured to provide sensor inputs to the controller 20. In various embodiments, the data collected from the plurality of sensors 92 in the sensor system 18 may be utilized to monitor an environment around the vehicle 12. In some variations, the data collected from the plurality of sensors 92 in the sensor system 18 may be utilized by the controller 20 to map the features detected within the environment. The features detected within the environment may include, but are not limited to, the vehicle 12, objects 72 such as persons and/or anchoring points, and other moving and stationary objects within the environment and within a prescribed distance from the vehicle 12.

Referring again to FIGS. 3 and 4, the sensor system 18 may include a winch sensor system 94. The winch sensor system 94 includes the plurality of sensors 92 that are configured to detect information pertinent to the winch assembly 14 and communicate said information to the controller 20, as provided herein. The plurality of sensors 92 may include one or a combination of visual sensors, radar sensors, lidar sensors, audio sensors, force sensors (e.g., torque sensors), speed sensors, and/or other various sensors. For example, the vehicle 12 may include one or more cameras 98 that monitor the winch assembly 14 and the environment around the vehicle 12. In such examples, one or more of the cameras 98 may be configured to determine physical wear of the winch assembly 14, interaction with the winch assembly 14, and/or a user approaching the winch assembly 14. In other examples, one or more sensors of the winch sensor system 94 may be configured to measure winch assembly 14 load. In such examples, the one or more sensors may be comprised of current sensors, torque sensors, displacement sensors, and various other force sensors. In further examples, one or more sensors of the winch sensor system 94 may be configured to detect how much cable 64 has been deployed from the spool 62 and the speed in which the cable 64 is being deployed from or retracted to the winch assembly 14. For example, the vehicle may include one or more cameras 98 configured to view the winch assembly 14, the spool 62, and a deployment range of the cable 64 in front of the winch assembly 14 such that a length of the cable 64 may be determined and odometry detected. Additionally, the vehicle 12 may include other various sensors, such as inductive speed sensors, optical speed sensors, rotational position sensors and other various sensors that may detect a rotational speed and number of rotations of the spool 62 such that a speed of cable 64 deployment or retraction may be calculated and cable 64 length determined. The vehicle 12 may also include audio sensors proximate or coupled to the winch assembly 14 and one or more force and/or speed sensors that are coupled to the winch assembly 14.

In some examples, the winch sensor system 94 may detect various operating parameters of the winch assembly 14, such as a rotational speed of the winch assembly 14, a force exerted on the winch assembly 14, and wear of various winch assembly 14 components. With regard to detecting wear, the vehicle winch sensor system 94, in some examples, may be configured to monitor and detect cable 64 wear, engagement element 70 integrity, motor 66 efficiency, and/or bearing 58 integrity. For example, a plurality of force sensors and audio sensors may be mechanically coupled to the shaft 56, the spool 62, one or more bearing housings 60, and/or other winch assembly 14 components, wherein each sensor is configured to detect information pertinent to each component, such as sound and friction during rotation of the bearing 58, torque on the shaft 56 and/or spool 62, and other information. In other examples, one or more cameras 98 may be directed towards the winch assembly 14 and detect physical wear. In such examples, the camera 98 may be directed towards the spool 62 such that the camera 98 may detect and record the physical wear of the cable 64 (e.g., cable fray) on the spool 62 and of the cable 64 extending out of the opening 42. The winch sensor system 94 may be further configured to detect and monitor housing 50 integrity, the length of use (e.g., operating hours) of the winch assembly 14, and/or the time duration between servicing various winch assembly 14 components. According to various aspects of the present disclosure, the winch sensor system 94 may output information to the controller 20, wherein the controller 20 may analyze the information to determine the operational condition, such as a service condition of the winch assembly 14. It is generally contemplated that the winch sensor system 94 may detect wear of various winch assembly 14 components without departing from the teachings herein.

With respect to determining the position of the vehicle 12 and the winch assembly 14, the winch system 10 may receive vehicle 12 and status-related information from additional sensors and devices. The information may include sensor information from the sensor system 18, positioning information from one or more positioning systems, which may include a global positioning system (GPS) 96 and/or dead reckoning system, to determine a coordinate location of the vehicle 12 and/or winch assembly 14 based on the location of one or more positioning devices.

With reference to FIG. 4, the winch system 10 in the illustrated embodiment may communicate with one or more devices, including a vehicle security system 100, which may monitor and detect various aspects of the vehicle 12, the winch system 10, and the environment external the vehicle 12. In some embodiments, the vehicle security system 100 may utilize sensors, the controller 20, and/or software for monitoring and detection. For example, the sensor system 18 may include an anti-theft sensor system 102, which is comprised of various sensors, such as imaging sensors, audio sensors, etc. In some examples, the anti-theft sensor system 102 may also include software that directs the controller 20 to execute a routine that monitors the winch system 10, as provided herein. In yet other embodiments, the anti-theft sensor system 102 may utilize the sensor system 18 and software to monitor the status of the vehicle 12 and the winch system 10. For example, the anti-theft sensor system 102 may include software that directs the controller 20 to monitor the winch assembly 14, via a camera 98 and audio sensors proximate the sensor, to detect whether tampering has occurred with the winch assembly 14, or whether the winch assembly 14 has been decoupled from the vehicle 12, as provided herein.

The vehicle security system 100 may further include a vehicle alert system 110, which may prompt visual, auditory, and/or tactile signals. For instance, vehicle lights 112, such as emergency flashers, may provide a visual alert, and an audio system 114 may provide an audible alert via an audio system 114, such as a car horn or car speaker. Additionally, the winch system 10 may communicate with a vehicle microphone of the audio system 114. For example, the audio system 114 may prompt a user to respond to the winch system 10, wherein the audio system 114 gives the auditory messages and receives the auditory response through a vehicle microphone.

Referring to FIG. 4, the winch system 10 includes the audio system 114. In some embodiments, the audio system 114 includes at least one speaker in communication with the controller 20. According to various embodiments, the audio system 114 is configured to receive inputs from the controller 20 and output audible sound after receiving an input from the controller 20.

Referring further to FIG. 4, the winch system 10 includes the display 22 in communication with the controller 20. In some embodiments, the display 22 may be coupled to the vehicle 12. For example, the display 22 may be configured as a user interface disposed within an interior of the vehicle 12. In other examples, the display 22 may be configured as a vehicle instrument cluster, a center stack display, or may be configured as one of various other displays within the vehicle interior. In yet other examples, the display 22 may be configured as a display 22 of an electronic device in communication with the controller 20, but apart from the vehicle 12. For example, the display 22 may be the display 22 of a mobile device 120, a stationary and/or portable audio device, and/or other electronic devices. According to various aspects, the display 22 is configured to receive inputs from the controller 20 and present a message, image, and/or video after receiving an input from the controller 20. Additionally, it is generally contemplated that the display 22 may be configured as a display 22 of various devices and/or assemblies, so long as the display 22 may receive an input from the controller 20.

Referring again to FIG. 4, the winch system 10 includes the mobile device 120. The mobile device 120 may include a plurality of sensors 92, such as positioning sensors, touch sensors, force sensors, audio sensors, and other various sensors. In some examples, the mobile device 120 may also include the display 22. According to various aspects, the mobile device 120 may comprise one or more devices, such as a cell phone, a personal computer, a key fob, and other various electronic devices. For example, the mobile device 120 may be a cell phone with the display 22 and a plurality of sensors 92 that detect user input and detect user location and movement. In some examples, the mobile device 120 is configured to receive inputs from the controller 20 and provide a response to the controller 20, such as producing a message on the display 22, an audible message, or tactile feedback (e.g., a vibration). In other examples, the mobile device 120 is configured to be in communication with the controller 20 and output information from the plurality of sensors 92 of the mobile device 120 to the controller 20.

As illustrated in FIG. 4, the controller 20 is configured with a microprocessor 130 to process logic and routines 140, 142, 144 stored in memory 146 that receives information from the sensor system 18, the winch sensor system 94, object proximity sensors 148, the vehicle security system 100, the anti-theft sensor system 102, the mobile device 120, the auxiliary power system 80, and the motor 66. The controller 20 may generate audio or visual statements, as well as winch assembly 14 and vehicle 12 information and commands as a function of all or a portion of the information received. Thereafter, the winch assembly 14 and vehicle 12 information and commands may be provided to the sensor system 18, the vehicle security system 100, the winch assembly 14, the mobile device 120, and the auxiliary power system 80 to ensure proper monitoring and detection of the winch assembly 14. In some examples, such information and commands ensure proper use of the winch assembly 14 by indicating to a user that one or more various components of the winch assembly 14 may need servicing. In other examples, such information and commands may ensure proper use of the winch assembly 14 by ensuring authorized use of the winch assembly 14. For example, such information and commands may ensure that an authorized user is operating the winch assembly 14, that the winch assembly 14 has not been tampered with, that the winch assembly 14 has not been partially or completely decoupled from the vehicle 12, and/or that at least authorized user is within or proximate the vehicle 12. Additionally, the controller 20 may be configured to prompt one or more vehicle 12 systems and/or the winch assembly 14 to execute one or more winch measures, as provided herein.

The controller 20 may include the microprocessor 130 as shown, and/or other analog and/or digital circuitry for processing one or more routines 140, 142, 144 stored in memory 146. Also, the controller 20 may include the memory 146 for storing one or more routines, including an operational condition routine 140, a winch service routine 142, and an authorized use routine 144. In some examples, the controller 20 may be a stand-alone dedicated controller or may be a shared controller integrated with other control functions, such as a controller integrated with the sensor system 18 and other conceivable on-board or off-board vehicle 12 control systems. It should be appreciated that operations processed by the controller 20 may be processed by one or more other controllers of the vehicle 12. For example, the vehicle 12 may include a controller area network (CAN) bus and the vehicle 12 and winch assembly 14 may include a plurality of controllers, such as a controller disposed within the vehicle 12, a controller disposed within the winch assembly 14, a controller disposed within the mobile device 120, and other various controllers, wherein any of which may process a portion or all of the operations processed by the controller 20.

The environment monitored by the winch system 10 may be defined by the controller 20. In some embodiments, the environment monitored by the winch system 10 may be defined as the area around the winch assembly 14. According to various embodiments, the controller 20 may monitor an environment or area that falls within detection of the sensor system 18 and/or the detection of other various sensors. For example, if a camera 98 is facing the winch assembly 14, the controller 20 may at least monitor an area that is around and includes the winch assembly 14. In another embodiment, the area monitored by the controller 20 may be determined by an operational state of the vehicle 12. For example, if the winch assembly 14 is in-use by an authorized user, the controller 20 may monitor an area that relates to said use. Additionally, in other examples, the winch assembly 14 may detect an area encompassing the vehicle 12 when the vehicle 12 is not in-use. Additionally, or alternatively, it is generally contemplated that the controller 20 may monitor various environments and/or multiple environments.

The controller 20 may detect an object 72 and generate a physical profile after detection of the object 72. In some embodiments, the object may be one or more persons and the physical profile generated may be a physical profile of a person. In some embodiments, the controller 20 may detect the object 72 and generate the physical profile from data obtained via the sensor system 18 and a routine. In yet other embodiments, the controller 20 may detect the object 72 and generate a physical profile once the object 72 is within a prescribed distance of the vehicle 12 or the winch system 10. For example, the controller 20 may receive data from a plurality of imaging sensors (e.g., a plurality of cameras), a plurality of audio sensors, and object proximity sensors 148 that detect the object 72 proximate the vehicle 12. The controller 20 may then execute a routine and determine that the object 72 is a person, another vehicle, a winch anchoring point, or one or more various types of objects. Next, the controller 20 may then classify the object 72 by generating a physical profile of the object 72 via a routine, wherein the generation and classification of the object 72 via the physical profile may be dictated by one or more attributes of the object 72. For example, the physical profile may be determined by the height, width, or depth of the object 72, or by whether the object 72 is moving or static. Additionally, if the object 72 is determined to be a person, the physical profile may be dictated by height, width, gait, limb length, and/or apparel worn by the person. Additionally, it is generally contemplated that the controller 20 may detect and classify multiple objects external from the vehicle 12.

The controller 20 may be configured to record the information received from the sensor system 18 in the memory 146. In some examples, the controller 20 may be configured to record the information and categorize the information over a length of time, and then define a duration of use of the winch assembly 14. The controller 20 may be configured to then determine a duration of use of various components of the winch assembly 14. For example, the controller 20 may be configured to record a duration of use in operating hours of the motor 66. In other examples, the controller 20 may be configured to determine a duration of use from other recorded parameters, such as rotations of the spool 62 or the amount of extensions and retractions of the cable 64. According to various aspects, the controller 20 may be configured to define a duration of use threshold of the winch assembly 14 and various components of the winch assembly 14. The controller 20, in some examples, may then be configured to compare the recorded duration of use against the duration of use threshold and output a signal if the duration of use exceeds the duration of use threshold, as provided herein. Additionally, or alternatively, it is generally contemplated that the controller 20 may be configured to store various forms of information from the sensor system 18 in the memory 146, such as recorded video or audio from the sensor system 18.

Figure 5:
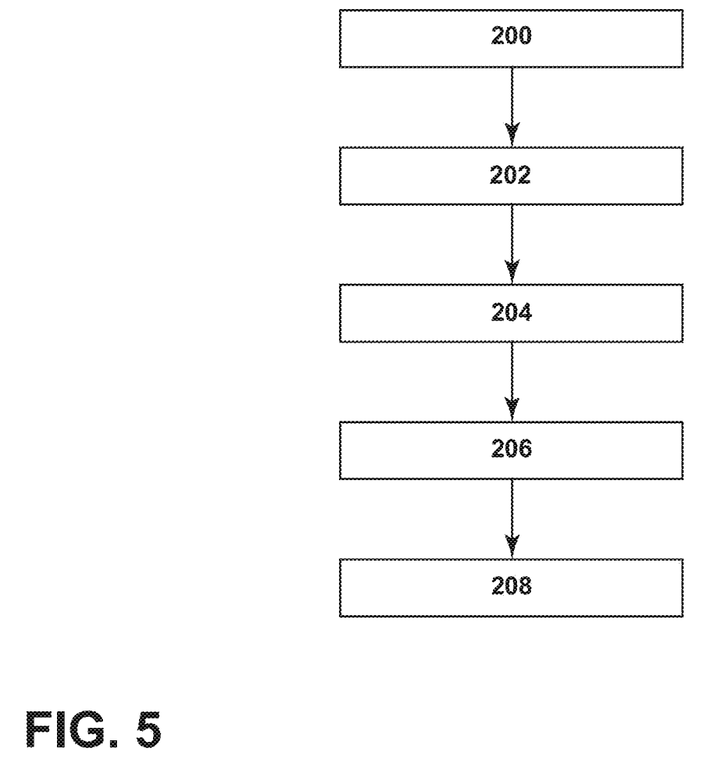
FIG. 5 is a flow diagram illustrating the steps of a routine of the winch system, according to one example.

Referring to FIGS. 4 and 5, the controller 20 may determine an operational condition of the winch assembly 14. In some embodiments, the operational condition of the winch assembly 14 may further comprise the service condition of the winch assembly 14, such as whether the winch assembly 14 requires servicing. In other embodiments, the operational condition of the winch assembly 14 may further comprise an authorized use or an unauthorized use of the winch assembly 14, such as a determination as to whether an authorized user is operating the winch assembly 14 or whether tampering has occurred. In yet other embodiments, the operational condition may further comprise the service condition and an authorized use of the winch assembly 14, as provided herein. The controller 20 may determine an operational condition of the winch assembly 14 by information received from the sensor system 18 and other vehicle-related information. In particular, the controller 20 may run the operational condition routine 140 and determine an operational condition by analyzing data from the sensor system 18. In some embodiments, the controller 20 may reference one or more databases of various pre-defined winch assembly 14 operational conditions and/or parameters. Upon a determination of an operational condition of the winch assembly 14, the controller 20 may send an output to various vehicle 12 systems, as provided herein.

Referring further to FIGS. 4 and 5, the controller 20 may determine the operational condition of the winch assembly 14 via the winch service routine 142. In such examples, the operational condition may be defined as a service condition of the winch assembly 14 and the controller 20 may be configured to determine the service condition of the winch assembly 14. In various aspects, the controller 20 may be configured to determine a service condition when detecting whether various components of the winch assembly 14 require servicing, such as the motor 66, cable 64, bearings 58, or other various components. In other examples, the controller 20 may be configured to determine a service condition when determining whether the duration of use of various components of the winch assembly 14 exceeds a duration of use threshold. In yet other embodiments, the controller 20, via the winch service routine 142, may be configured to determine a service condition when determining whether a pre-defined operating condition has been exceeded, such as an operating temperature, a measured force, and/or an operating sound. According to various aspects, the controller 20, via the winch service routine 142, may determine a service condition of the winch assembly 14 from information received from the sensor system 18, the auxiliary power system 80, the winch assembly 14, the sensor system 18, and other various vehicle 12 systems. Additionally, it is generally contemplated that the controller 20 may reference one or more databases of various pre-defined service conditions and/or parameters.

Upon a determination of a service condition of the winch assembly 14, the controller 20, via the winch service routine 142, may be configured to communicate a signal to various vehicle 12 systems. In some examples, the controller 20 may be configured to communicate a signal to the display 22 that then indicates to a user that the winch assembly 14 requires servicing and/or that a service condition has occurred. For example, the controller 20, via the winch service routine 142, may determine that a recorded duration of use exceeds a duration of use threshold, and the controller 20 may then indicate to the user, via the display 22 in the vehicle 12 or on a mobile device 120, that servicing of the winch assembly 14 is suggested. In other examples, the controller 20 may be configured to communicate a signal to the vehicle security system 100 or a vehicle audio system 114 and indicate to a user that the winch assembly 14 requires servicing and/or that a service condition has occurred. For example, the controller 20, via the winch service routine 142 and information obtained from the sensor system 18, may determine that a winch assembly 14 component, such as the motor 66 and/or the cable 64 require servicing. The controller 20 may then output a signal to the audio system 114 and indicate to a user that winch assembly 14 components require servicing. Additionally, the controller 20 may be configured to communicate a signal to various systems after determining a service condition. For example, the controller 20, via the winch service routine 142, may determine that the winch assembly 14 has exceeded a temperature and/or force threshold. The controller 20 may then output a signal to the display 22 in the vehicle 12 and may also output a signal to the vehicle audio system 114, indicating to a user that a service condition has been met, such as the winch assembly 14 exceeds a temperature and/or force threshold. Further, the controller 20 may be configured to output a signal to the motor 66 and/or the auxiliary power system 80 when the controller 20 determines a service condition. For example, the controller 20 may determine a service condition when a detected operating temperature exceeds a pre-defined temperature threshold. The controller 20 may then output a signal to the motor 66 and/or the auxiliary power system 80, changing the winch assembly 14 from the active condition to the inactive condition.

Referring again to FIGS. 4 and 5, the controller 20 may determine the operational condition of the winch assembly 14 via the winch authorized use routine 144. In such examples, the operational condition may be defined as an authorized condition or an unauthorized condition of the winch assembly 14 and the controller 20 may be configured to determine the authorized condition and/or the unauthorized condition of the winch assembly 14. In various aspects, the controller 20 may be configured to determine an unauthorized condition of the winch assembly 14 when detecting tampering with the winch assembly 14. In such example, the controller 20 may be configured to determine tampering and an unauthorized condition by analyzing information from the sensor system 18 that indicates an interaction with the winch assembly 14 by a user and/or a locked condition of the vehicle 12. In other examples, the controller 20, via the authorized use routine 144, may be configured to determine an unauthorized condition of the winch assembly 14 when determining that an approaching user is an unauthorized user. In such examples, the controller 20 may determine whether the user is an unauthorized user by information obtained from the sensor system 18, a physical profile of the user, information from the mobile device 120, and/or various other information received by the controller 20. In yet other examples, the controller 20, via the authorized use routine 144, may be configured to determine an unauthorized condition of the winch assembly 14 when detecting that the winch assembly 14 is decoupled from the vehicle 12. Additionally, it is generally contemplated that the controller 20 may be configured to reference one or more databases and/or stored information when determining an authorized condition or an unauthorized condition.

Upon a determination of an authorized condition or an unauthorized condition, the controller 20, via execution of the authorized use routine 144, may be configured to output a signal to various vehicle 12 systems. In some examples, the controller 20 may be configured to output a signal to the display 22 that then indicates to a user that an unauthorized routine has been detected. In other examples, the controller 20 may be configured to output a signal to the display 22 that prompts the display 22 to present information from the sensor system 18 that the controller 20 used, via the authorized use routine 144, to determine the unauthorized condition. For example, the sensor system 18 may record video and audio that the controller 20 may analyze to determine tampering. The controller 20 may then output a signal to the display 22, prompting the display 22 to present a video, such as video indicating an interaction with the winch assembly 14, that the controller 20 analyzed when determining the tampering. In other examples, the controller 20 may be configured to output a signal to the winch assembly 14 to disable the winch assembly 14, changing the winch assembly 14 from the active condition to the inactive condition. For example, the controller 20 may determine an unauthorized condition after detecting that the winch assembly 14 is decoupled from the vehicle 12. The controller 20 may then output a signal to the winch assembly 14, disabling the winch assembly 14 while the winch assembly 14 is decoupled from the vehicle 12. In yet other examples, the controller 20 may be configured to output a signal to the vehicle security system 100, the vehicle alert system 110, and/or the vehicle audio system 114. For example, the controller 20 may be configured to output a signal to the vehicle alert system 110 and the vehicle audio system 114, prompting the vehicle alert system 110 to flash the vehicle lights 112 and the vehicle audio system 114 to emit a pre-defined sound, such as an audible alarm. Additionally, it is generally contemplated that the controller 20, via the authorized use routine 144, may be configured to output a signal to various vehicle 12 systems, without departing from the teachings herein.

With regard to detecting an operational condition via one of the provided routines 140, 142, 144, the controller 20 may be configured to execute each routine 140, 142, 144 in a variety of ways. For example, the controller 20 may be configured such that one or more of the routines 140, 142, 144 are loops. In other examples, the controller 20 may be configured such that the controller 20 executes the operational condition routine 140, and the service condition routine 142 and the authorized use routine 144 are sub-routines within the operational condition routine 140. In other examples, the controller 20 may be configured to sequentially and/or simultaneously execute one or more of the routines 140, 142, 144. In yet other examples, the controller 20 may be configured to execute a select routine depending on a state of the vehicle 12 and the winch assembly 14. For example, the controller 20 may be configured to execute the authorized use routine 144 when the vehicle 12 is in a static state and/or the winch assembly 14 is not being used for a winching operation.

With respect to the general operation of the winch system 10, as illustrated in the system diagram of FIG. 4, the winch system 10 includes various other sensors and devices that obtain or otherwise provide vehicle 12 and winch assembly 14 status-related information. This information includes positioning information from the global positioning system 96, which may include a dead reckoning system, or, in addition, or as an alternative, a global positioning system (GPS) 96, to determine a coordinate location of the vehicle 12 and/or the winch assembly 14 based on the one or more locations of the devices within the global positioning system 96.

Referring now to FIG. 5, an embodiment of the operational condition routine 140 for use in the winch system 10 is illustrated. In the illustrated embodiment, the operational condition routine 140 begins in step 200 by receiving signals from the sensor system 18 of the vehicle 12. These signals may pertain to parameters and conditions relating to the winch system 10, in particular, the vehicle 12, the winch assembly 14, the auxiliary power system 80, the environment around the vehicle 12 and the winch assembly 14, etc.

At step 202, the received signals may be utilized to estimate various vehicle 12 parameters and conditions. For example, the receiving signals may be used to determine accessories coupled to the vehicle 12, such as the winch assembly 14, a driving mode of the vehicle 12, a locked condition of the vehicle 12 condition, a passenger in the vehicle 12, a condition of the ignition, motion of the vehicle 12, and other various parameters and conditions of the vehicle 12.

At step 204, the winch system 10 may determine whether the winch assembly 14 is in an active condition or inactive condition. Next, at step 206, the winch system 10 may then determine the operational condition of the winch assembly 14, such as a service condition or an unauthorized condition. At step 206, the winch system 10 may determine the operational condition of the winch assembly 14 by executing one or more sub-routines, such as the service condition routine 142 and/or the authorized use routine 144. For example, the controller 20 may execute the service condition routine 142 and determine a service condition after determining that a duration of use threshold has been exceeded and that the cable 64 requires servicing. In another example, the controller 20 may execute the authorized use routine 144 and determine an unauthorized condition after detecting a locked condition of the vehicle 12 and an interaction between a user and the winch assembly 14.

If the winch system 10 determines an operational condition, such as a service condition and/or an unauthorized condition, the controller 20 will output a response in step 208. In some embodiments, the controller 20 will output a signal response to the display 22, which then presents a message that indicates the determined operational condition, such as a service condition or an unauthorized use condition. For example, the controller 20 may determine that servicing is required for the motor 66 and the bearing 58 of the winch assembly 14. The controller 20 may then output a signal to the display 22, which then presents a message that indicates to the user that the motor 66 and the bearing 58 require servicing. In another example, the controller 20 may determine an unauthorized condition after detecting a locked condition of the vehicle 12 and decoupling of the winch assembly 14 from the vehicle 12. The controller 20 may then output a signal to the winch assembly 14 that disables the winch assembly 14 and another signal to the display 22, which then presents a message to the user, indicating the decoupling of the winch assembly 14 from the vehicle 12. Thereafter, the controller 20 may return to step 204 and determine whether the winch assembly 14 is in the active condition or inactive condition and then determine an operational condition of the winch assembly 14.

Referring further to step 208, in some embodiments, the output response, generated by the controller 20, may comprise sending a signal to the mobile device 120. For example, if the controller 20 determines an unauthorized condition after detecting tampering with the winch assembly 14, the controller 20 may output a signal to the mobile device 120, prompting the mobile device 120 to display a notification of the tampering and to present information, such as video and/or audio from the sensor system 18 that the controller 20 analyzed to determine tampering.

Additionally, the controller 20 may output a signal to various vehicle 12 systems in step 208 after determining an operational condition in step 206. In some examples, the controller 20 may output a signal to the vehicle security system 100. For example, the controller 20 may output a signal to the vehicle security system 100, prompting the vehicle lights 112 to flash after an unauthorized condition is determined. In other examples, the controller 20 may output a signal to the vehicle audio system 114, prompting the audio system 114 to emit sound after an operational condition has been detected, wherein the sound indicates to a user what operational condition(s) have been detected. Additionally, it is generally contemplated that the controller 20 may output a signal(s) to various vehicle 12 systems after determining an operational condition without departing from the teachings herein.

The present disclosure may provide for a variety of advantages. For example, operation of the winch system 10 enables a user to actively detect and monitor an operational condition of the winch assembly 14. Such detection and monitoring of the winch assembly 14 advantageously assists a user in maintaining and servicing the winch assembly 14 as the winch assembly 14 is selectively used over time. Additionally, the detection and monitoring of an operational condition of the winch assembly 14 assists a user in maintaining an authorized use of the winch assembly 14 and in preventing an unauthorized removal of the winch assembly 14.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A winch system for a vehicle, comprising:
a winch assembly operably coupled to a body, the winch assembly comprising a housing, a spool rotatably disposed within the housing, a motor coupled to the spool and to the housing, and a cable operably disposed on the spool;
a sensor system configured to monitor the winch assembly; and
a controller processing information received from the sensor system, wherein the controller is configured to determine a duration of use of the winch assembly based on information from the sensor system, and wherein the controller is configured to determine a service condition of the winch assembly when the duration of use exceeds a duration of use threshold, wherein the controller is configured to detect an interaction with the winch assembly based on information from the sensor system, and wherein the controller is configured to determine tampering with the winch assembly based on a locked condition of the vehicle and the detected interaction with the winch assembly.

2. The winch system of claim 1, further comprising a display in communication with the controller, wherein the controller is configured to communicate a signal to the display to generate a visual message when the controller determines the service condition.

3. The winch system of claim 2, further comprising a mobile device, the mobile device including the display.

4. The winch system of claim 3, wherein the controller is configured to communicate a signal to the display to generate a video of the interaction when the controller determines the tampering.

5. The winch system of claim 1, wherein the sensor system is configured to detect physical wear on the winch assembly, and wherein the controller is configured to determine the service condition based on the physical wear.

6. The winch system of claim 5, wherein the controller is configured to define a temperature threshold of the winch assembly, and wherein the controller is configured to communicate a signal to the winch assembly to change the winch assembly from an active condition to an inactive condition when a temperature of the winch assembly exceeds the temperature threshold.

7. The winch system of claim 6, wherein the controller is configured to determine a service condition of at least one of the housing, the spool, the motor, and the cable based on information received from the sensor system.

8. The winch system of claim 1, wherein the sensor system further comprises a camera configured to monitor the winch assembly.

9. The winch system of claim 8, wherein the camera is coupled to the housing.

10. A winch system for a vehicle, comprising:
a winch assembly operably coupled to a body, the winch assembly being operable between an active condition and an inactive condition;

a sensor system configured to monitor the winch assembly;

a controller processing information received from the sensor system, wherein the controller is configured to determine tampering with the winch assembly based on information from the sensor system, and wherein the controller is configured to determine an unauthorized condition based on the tampering, wherein the controller is configured to detect an interaction with the winch assembly based on information from the sensor system, and wherein the controller is configured to determine the tampering based on a locked condition of the vehicle and the interaction; and a mobile device comprising a display in communication with the controller, wherein the controller is configured to communicate a signal to the display to generate a visual message when the controller determines the unauthorized condition, and wherein the controller is configured to communicate a signal to the display to generate a video of the interaction when the controller determines the tampering.

11. The winch system of claim 10, wherein the winch assembly is configured to operably decouple from the body, and wherein the controller is configured to determine when the winch assembly is coupled to the body and when the winch assembly is decoupled from the body based on information from the sensor system, and wherein the controller is configured to determine the unauthorized condition when the winch assembly is decoupled from the body, and wherein the controller is configured to communicate a signal to the winch assembly to change the winch assembly from the active condition to the inactive condition when the winch assembly is decoupled from the body.

12. The winch system of claim 10, wherein the controller is configured to communicate a signal to the winch assembly to change the winch assembly from the active condition to the inactive condition based on the unauthorized condition.

13. The winch system of claim 10, wherein the controller is configured to determine an unauthorized user based on information received from the sensor system, and wherein the controller is configured to determine the unauthorized condition based on the unauthorized user.

* * * * *